Patented Dec. 16, 1930

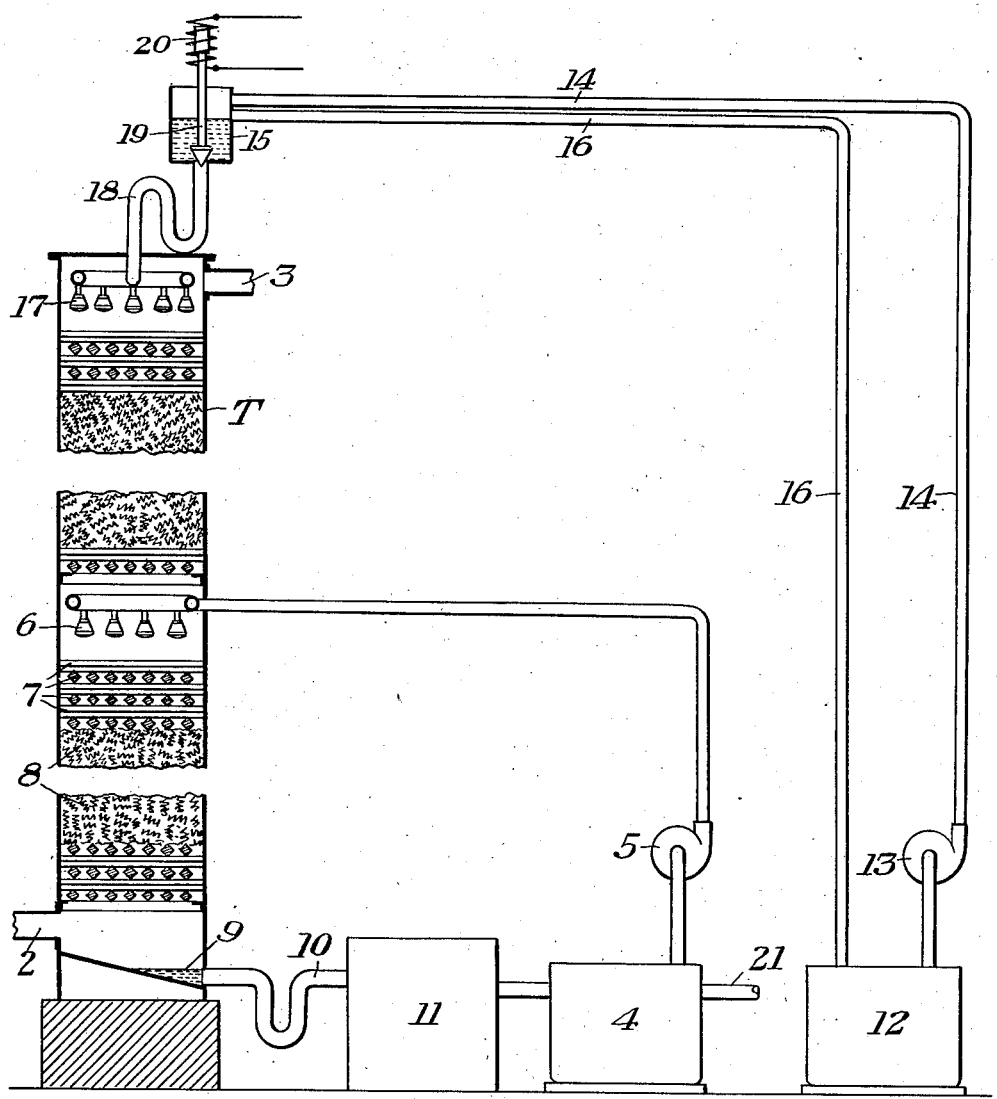

1,785,365

UNITED STATES PATENT OFFICE

GILBERT E. SEIL, OF NEWARK, NEW JERSEY, ASSIGNOR TO KOPPERS COMPANY, OF PITTSBURGH, PENNSYLVANIA, A CORPORATION OF PENNSYLVANIA

PROCESS FOR THE REMOVAL OF NAPHTHALENE AND CARBON BISULPHIDE FROM GASES

Application filed May 6, 1926. Serial No. 107,062.

This invention relates to the removal of naphthalene and carbon bisulphide from gases, and is particularly useful for the removal of such substances from flowing fuel gas such as coal gas, or the like.

The importance of naphthalene removal from fuel gases is set out in United States Patent of Frederick W. Sperr, Jr., No. 1,578,687, dated March 30, 1926. That patent also describes and claims a process which is highly advantageous for the removal of naphthalene from fuel gases. The Sperr process consists briefly in subjecting the gas to contact with a large amount of a suitable solvent, such as kerosene oil, in recirculation, for the removal of a part of the naphthalene, and subsequently subjecting the partially purified gas to the action of small amounts of fresh solvent, preferably introduced intermittently.

The Sperr process is described in the Sperr patent as being carried out in a treating tower wherein the recirculated solvent is supplied to the lower portions of the tower and the gas being treated is passed upwardly therethrough. The top section of the tower is utilized for the fresh oil treatment and the oil supplied in this upper stage is permitted to flow downwardly and constantly renew the recirculated solvent so as to keep it up to a desired standard of purity.

I have discovered that the Sperr process or other processes for removing naphthalene from gas by the use of a solvent, such as kerosene oil, may be modified to effect the removal of carbon bisulphide present in the gas. Where carbon bisulphide is present in the gas it will dissolve in the solvent until an equilibrium between the gas and the solvent with respect to dissolved carbon bisulphide is maintained. Therefore, by extracting the carbon bisulphide from the recirculated solvent, the said solvent, besides being effective for removing naphthalene, may also be used to remove carbon bisulphide from the gas.

The accompanying drawing is a diagrammatic sketch of a preferred apparatus for carrying out my invention.

In the illustrated embodiment of the invention there is shown a tower indicated generally by the reference character T, having a gas inlet 2 and a gas outlet 3. A suitable solvent, such as kerosene oil, is withdrawn from a tank 4 by a pump 5, and is supplied to nozzles 6 part way up the tower T. The solvent is distributed over the area of the tower by diamond hurdles 7 and an intimate contact of the solvent with the gas which is passing upwardly through the tower is insured by the use of a tower packing 8 which may be metal turnings as disclosed in the Sperr patent.

As the solvent passes downwardly through the tower, it is effective for the removal of a portion of the naphthalene contained in the rising gas and also for the removal of carbon bisulphide therein. The solvent collects at 9 in the tower and passes through a pipe 10 having a trap therein to a treating station 11. This treating station may be of any desired character, and the solvent is therein treated for the removal of carbon bisulphide.

For the carbon bisulphide extraction, I may treat the solvent with a solution of an alkali, as for example, sodium hydroxide or sodium carbonate, potassium hydroxide, or the like.

I may use aqueous solutions of such compounds for extraction of carbon bisulphide from the kerosene or other solvent, but I prefer to use alcoholic solutions. By "alcoholic" I mean not only ethyl alcohol, but also methyl alcohol, amyl alcohol, any of the polyhydric alcohols, such as glycol, or any other alcohol.

Using alcoholic solutions, I may produce valuable xanthates as end products of my process, although when aqueous solutions are used, the formation of xanthate may be carried out subsequently in the presence of alcohol. However, the invention is not limited to the formation of xanthates as an end product, as the removal of carbon bisulphide itself is of sufficient importance to justify the process.

The solvent is returned to the tank 4 and is recirculated through the lower portion of the tower substantially as described in the Sperr patent.

The gas is given a final treatment by fresh solvent, which is preferably supplied intermittently. This fresh solvent is withdrawn from a tank 12 by a pump 13 and pumped through a conduit 14 to a tank 15 above the tower. An overflow conduit 16 leads back to the tank 12.

The tank 15 is connected to spray nozzles 17 through a conduit 18, and the flow of solvent to these spray nozzles is regulated by a magnetically operated valve 19, which is preferably operated at timed intervals by an electro-magnet 20. The fresh solvent, which is supplied to the tower through the spray nozzles 17, is effective for a final naphthalene removal step and also for the removal of carbon bisulphide, if any remains in the gas, but even after this purification step, it still has a considerable capacity for further absorption for these substances, and it is, therefore, permitted to flow downwardly through the tower to mingle with and renew the recirculated solvent. In this manner the recirculated solvent is kept up to a desired standard of purity, so far as naphthalene absorptive capacity is concerned, and the treating chamber 11 is effective for keeping the recirculated solvent up to a desired standard, so far as carbon bisulphide absorptive capacity is concerned. The excess of solvent in the recirculating stage, which is occasioned by the addition of solvent from the upper section of the tower, is taken off through an overflow conduit 21 in the tank 4.

It will be understood that I have used a term "fuel gas" as a term of general definition and not of limitation, and that illuminating gas, for example, is included in its scope.

While I have described my process as applied to the removal of naphthalene from gases, it is to be understood that the process is not limited specifically thereto, but also contemplates the removal of analogous hydrocarbons such as anthracone.

The operation of the naphthalene removal system will not be affected by my process. I have described a preferred form of the invention, but it will be understood that it is not limited to the particular form shown as various changes may be made. For example, the carbon bisulphide extraction may be carried out by withdrawing the solvent from the recirculating system for a time, treating it to effect removal of carbon bisulphide, and then returning it to the system. The invention may be otherwise embodied or practiced within the scope of the following claims.

I claim:

1. In a process of removing both naphthalene and carbon bisulphide from flowing fuel gas containing them, the steps comprising recirculating in the path of the gas a solvent which will absorb both naphthalene and carbon bisulphide, withdrawing portions of the solvent to reduce the amount of naphthalene contained in the recirculated body of solvent, adding relatively fresh solvent to maintain the solvent at a substantial degree of purity, and treating the recirculated solvent to remove carbon bisulphide therefrom and thus maintain in the solvent a substantial capacity for absorbing carbon bisulphide from the gas.

2. In a continuous process of removing both naphthalene and carbon bisulphide from gas containing them, the steps comprising providing a solvent effective for absorbing both naphthalene and carbon bisulphide, bringing the solvent into contact with the gas for absorbing such substances, withdrawing portions of the solvent to reduce the amount of naphthalene contained in the recirculated body of solvent, treating the recirculated solvent to remove carbon bisulphide therefrom and thus maintain in said recirculated solvent a substantial capacity for absorbing carbon bisulphide from the gas, and returning the treated solvent to the recirculatory system.

3. The process of removing both naphthalene and carbon bisulphide from flowing fuel gas containing them which comprises recirculating in the path of the gas a solvent which will absorb both naphthalene and carbon bisulphide, treating said recirculated solvent to remove carbon bisulphide therefrom and thus maintain in said recirculated solvent a substantial capacity for absorbing carbon bisulphide from the gas, withdrawing portions of the recirculated solvent to reduce the amount of naphthalene contained in the recirculated body of solvent, subsequently treating the gas with fresh solvent and permitting said subsequently added solvent to mingle with and refresh said recirculated solvent.

4. The process of removing both naphthalene and carbon bisulphide from flowing fuel gas containing them which comprises recirculating in the path of the gas a solvent which will absorb both naphthalene and carbon bisulphide, treating said recirculated solvent to remove carbon bisulphide therefrom and thus maintain in said recirculated solvent a substantial capacity for absorbing carbon bisulphide from the gas, subsequently treating the gas with unrecirculated fresh solvent, permitting said unrecirculated solvent after said subsequent treatment of the gas to mingle with and refresh said recirculated solvent, and withdrawing an amount of the recirculated solvent equivalent to the amount of said fresh solvent to reduce the amount of naphthalene contained in the recirculated body of solvent.

In testimony whereof I have hereunto set my hand.

GILBERT E. SEIL.